Oct. 15, 1935.                E. A. ZEMPEL                2,017,332
                               TOOL HOLDER
                          Filed July 31, 1933          2 Sheets-Sheet 1
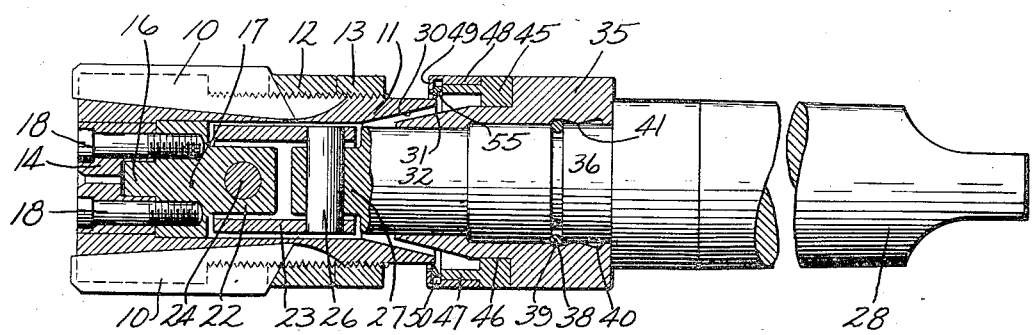
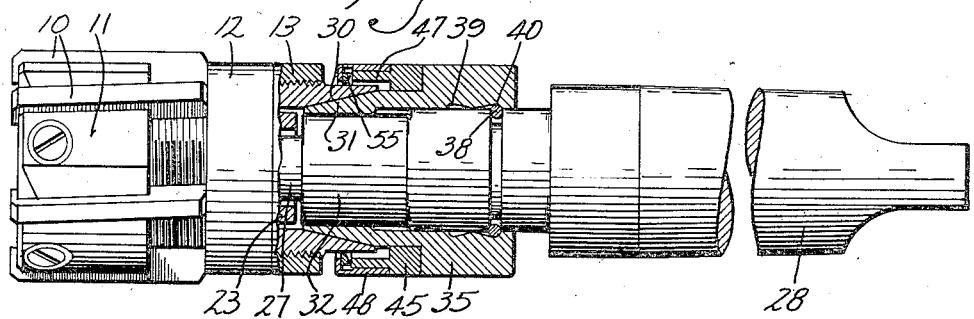
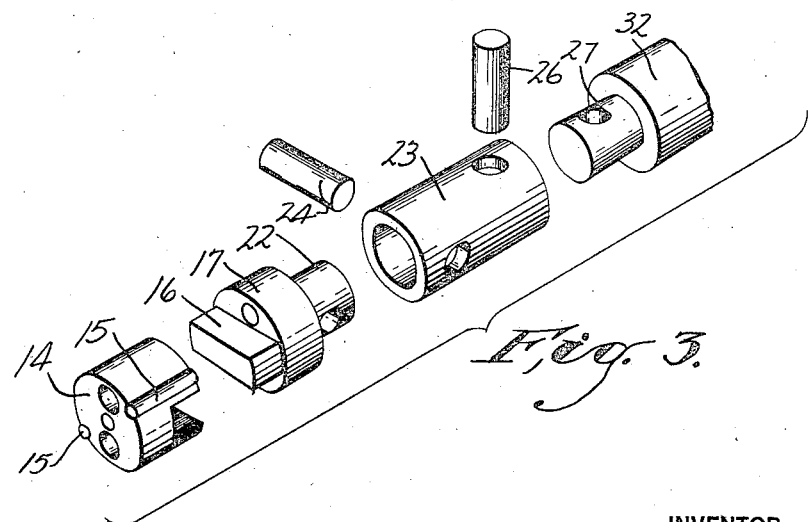
INVENTOR
Edward A. Zempel
BY Wheeler, Wheeler & Wheeler
ATTORNEYS Oct. 15, 1935.                E. A. ZEMPEL                2,017,332
                               TOOL HOLDER
                           Filed July 31, 1933           2 Sheets-Sheet 2
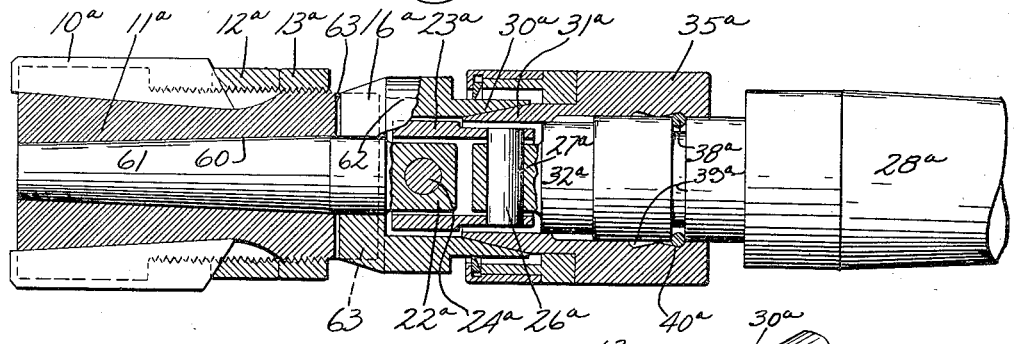
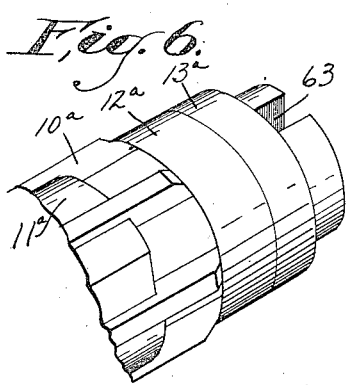
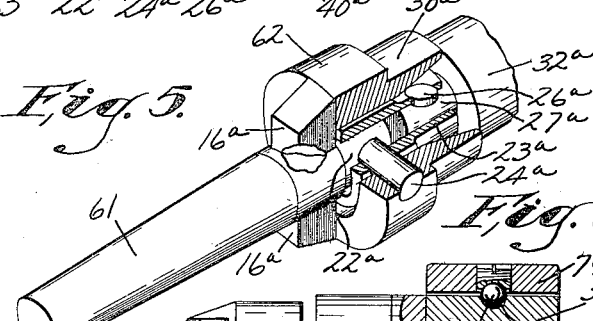
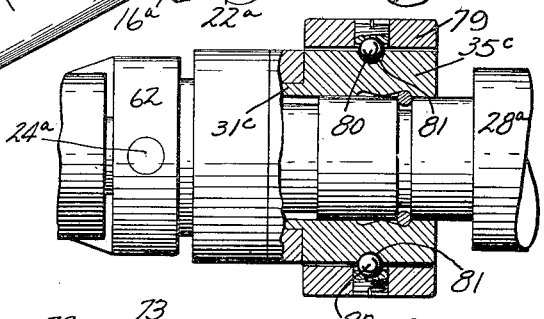
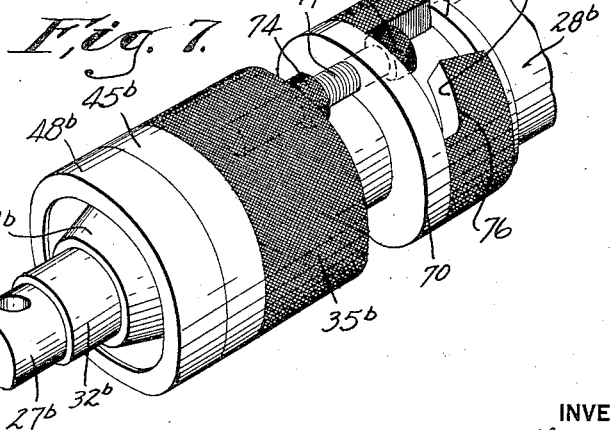
INVENTOR
Edward A. Zempel
BY
Wheeler, Wheeler & Wheeler
ATTORNEYS Patented Oct. 15, 1935

2,017,332

UNITED STATES PATENT OFFICE 2,017,332

TOOL HOLDER

Edward A. Zempel, Milwaukee, Wis.

Application July 31, 1933, Serial No. 682,938

7 Claims. (Cl. 279—16)

My invention relates to improvements in tool holders with particular reference to holders having a floating connecting element adapted to permit a certain degree of self-adjustment of piloted tools.

Objects of my invention are to provide a floating tool holder with locking means which are safely adjustable while the tool is in operation and which in one position will secure the tool holder in axial alignment with a driving shank or arbor, and in another position will release it for a floating movement of accommodation when a given portion of the work is out of line with the axis of the arbor to provide improved means for allowing floating movements of a tool holder either in parallel offset relation to the arbor axis or at an angle thereto; and to provide a floating coupling adapted to be associated with tool holders of various types.

A specific object is to provide a floating tool holder and its arbor with adjustable clutch members, one of which may be manually adjusted regardless of whether the tool is or is not in operation to lock the holder in alignment with the arbor or release it for floating movements. A further specific object is to provide an improved coupling for permitting floating movements of a tool holder.

In the drawings:

Figure 1 is a view in longitudinal section of a tool holder embodying one form of my invention in which the floating elements are installed within a reaming head in unlocked relation to the shank or arbor, the latter being shown in full.

Figure 2 is a view of the same, partly in side elevation and partly in longitudinal section through the locking elements and associated parts, illustrating the reaming head in locked relation to the shank or arbor.

Figure 3 is an assembly diagram of the floating coupling showing the elements in perspective.

Figure 4 is a view similar to Figure 1, but showing a modified form of construction in which the coupling is interposed between the reaming head or tool holder and the driving shank or arbor.

Figure 5 is a view of a modified coupling member shown in Figure 4 showing the same partly in perspective and partly in section with the associated portion of the shank, but with the cone clutch removed.

Figure 6 is a fragmentary perspective view of a tool holder or reamer head of the type shown in Figure 4.

Figure 7 is a perspective view of a modified form of locking mechanism showing a fragment of a driving shank or arbor modified to suit the requirements of the modified locking mechanism.

Figure 8 is a detail showing a modified lock actuating collar.

Like parts are designated by same reference characters throughout the several views.

In Figure 1 a set of reamer blades or cutters 10 are secured in a customary manner within suitable grooves formed in a holder 11, the cutters being held in position by lock nuts 12 and 13. The outer end of the holder receives an end block or plug 14 which is pressed into the holder and secured thereto by pins 15 which also serve as keys to securely anchor the block to the holder for transmission of rotative movement.

The inner end of this block has a transverse channel which receives a rib 16 carried by the coupling member 17, the rib being rectangular in cross section and fitted to the channel. This coupling member 17 is also secured to the end plug 14 by bolts 18.

The coupling member 17 has a reduced inner end portion 22 which fits loosely within a sleeve element 23 of the coupling and is connected therewith by a cross pin 24. The reduced portion 22 is free to slide upon the cross pin 24 to an extent permitted by the difference between the internal diameter of the sleeve and the diameter of the portion 22.

The sleeve 23 is similarly connected by a cross pin 26 with a reduced end portion 27 of the driving shank or arbor 28. But the pin 26 is at right angles to the pin 24 and therefore the coupling element 17 is connected to the arbor 28 by what may be referred to as a double knuckle joint, the sleeve 23 being permitted to rock upon the pin 26 and the coupling element 17 being permitted to rock upon the pin 24 at right angles to the rocking or tilting movement of sleeve 23 upon pin 26. The member 17 and block 14 are rigidly connected with each other and constitute a part of the tool holder 11, whereas the sleeve 23 with its two pivot pins 24 and 26 constitutes a floating coupling between the driving element or shank 28 and the tool holder.

Sufficient clearance is provided between the sleeve 23 and the sleeve like portion 11 of the tool holder to allow a limited tilting movement of the coupling element or sleeve 23 within the tool holder. Also sufficient clearance is provided between the reduced end 27 of the arbor or driving shank 28, and the sleeve 23 to not only allow said tilting movement of the sleeve but to also allow the sleeve and its coupling pin 26 to slide transversely with reference to the axis of the arbor to the limited extent permitted by such clearance.

Inasmuch as the sleeve and pin 26 may slide along the axial line of the pin to this limited extent, whereas a similar sliding movement of the coupling element 17 is permitted along the axial line of the pin 24, it is obvious that the tool holder 11 will be permitted to rotate either in direct alignment with the axis of the arbor or shaft 28, or about an axis slightly offset although parallel with the axis of the arbor.

On the other hand it will be apparent that the presence of the double knuckle joint in the coupling assembly will also permit the tool holding sleeve 11 to revolve about an axis extending at a slight angle from the axis of the shank or arbor 28. The piloting of the reamer by the walls of the bore in which it is operating will determine whether the reamer will operate in alignment with the shaft, upon an offset line parallel thereto, or along a line oblique thereto, if not locked as hereinafter described.

This coupling is rugged and due to its simplicity of structure the number of parts is reduced to a minimum and each of the parts may be of maximum size with reference to the size of the tool holder. Also the facility with which the coupling elements may be mounted within the tool holder enables me to construct a tool holder and floating and driving assembly of exceedingly compact and inexpensive design.

Where the tool holder is to be revolved about an axis in true alignment with the axis of the shank, it is desirable that the sleeve-like member 11 of the tool holder should be rigidly anchored to the shank in its proper position of alignment. This is preferably accomplished in the structure shown in Figure 1 by providing the inner end of the sleeve 11 with a clutch member 30 having a conically tapered inner surface adapted to receive a cone clutch member 31, which is mounted to slide on the portion 32 of the shank into and out of contact with the clutch member 30. The clutch member 31 is connected with an adjusting collar 35 mounted to slide upon the portion 36 of the shank 28. A split anchor ring 38 formed of resilient material is mounted in an annular channel in the portion 36 of the arbor. It is under compression, whereby it tends to project slightly from the channel and find anchorage in either of the annular grooves 39 or 40 in the inner face of the collar 35. These grooves have side walls which conically converge and form a ridge 41 of approximately the diameter of the ungrooved portion of the collar.

When the ring 38 is engaged in one of the channels it tends to hold the collar in the position of adjustment which permits of such an engagement. But by applying manual pressure to move the collar longitudinally of the shank 28 the conical face of the groove may be forced against the ring to compress the latter until the rib 41 passes the ring, whereupon the ring is permitted to progressively expand into the other groove to lock collar 35 in its alternative position of adjustment.

The conical gripping faces 30 and 31 of the cone clutch have a pitch of less than 45 degrees with reference to the axis of the tool, whereby the radial pressures and friction are greater than the resultant axial pressures tending to cause a separation of the clutch members. On the other hand, the pitch must be sufficient to avoid binding frictional pressures of the conical faces upon each other of a character to require employment of a lever or other tool to separate them. In practice it will be desirable to give these conical faces substantially the degree of pitch illustrated in order to avoid unnecessary binding, while avoiding more than a slight tendency for the clutch members to separate under the influence of vibration while reaming is being done. This makes it possible to employ a detent such as the split ring 38, which finds sufficient anchorage in a groove of concave cross section to insure against an accidental retraction of the clutch member, although permitting such retraction when the exposed knurled surface of the collar 35 is grasped by the operator for that purpose.

Therefore, it is possible to first center the reamer with reference to the work and hold it in centered position by means of the cone clutch 31 during initial operations and until the reamer has entered the bore sufficiently to be self-guiding. Thereupon, the clutch 31 may be withdrawn from its gripping relation with the tool holder sleeve 11 and the boring operation may then be continued without cramping or binding effects such as would otherwise result from a slight deflection in the tool feeding carrier. Where the reamer is supported by a lathe turret, the infeeding movement frequently fails to conform to a straight line, and particularly so when the slideways have become worn, the wear being greatest in those portions of the way where the slide is most frequently actuated under heavy duty or load. Variations equal to .001 of an inch are common between the level of the slide when retracted and its level when well advanced from the retracted position.

In moving from one position to another the slide in one portion of its traverse is tilted and in another portion it may move horizontally at the lower level. To avoid cramping or binding of the reamer in the bore with a consequent tendency to scoring or offsetting from the true center line at which the reaming operation started, it is desirable to operate the reamer as a floating reamer after the initial boring operation has been performed.

By locating the coupling members within the tool holder between its conical face 30 and its front end and providing sufficient clearance for the desired offsetting and tilting movements, it is possible to operate the reamer without the vibratory or chittering effects, which may result when the floating couplings are located exterior to the holder. Thus, the reamer may be not only accurately centered during the initial operation of entering in the bore to a point where it will be guided by the work, but it may also be operated thereafter without binding and without chittering to produce precision results.

Also, inasmuch as the arbor 28 is normally free from rotary driving connection with the collar, the collar may be held in the hand of the operator while the reamer head is being initially centered, and as soon as accurate centering is accomplished, the operator may draw the collar rearwardly and release the reamer for flotation before releasing the collar from his grasp.

Referring to Figure 1, it will be observed that when the ring 38 is engaged in the channel 39, the collar 35 is held in a position with its clutch member 31 retracted from clutch member 30, whereas in Figure 2 the ring 38 is engaged in the channel 40, and holds the collar 35 with its clutch member 31 in engagement with the clutch member 30 of the tool holder.

The periphery of the collar 35 is knurled or otherwise suited for manual operation, and the collar may be adjusted at any time while the tools are in operation to permit floating movements of the tool holder or to lock it in axially aligned relation to the shank.

To exclude dust from the surfaces of the cone clutch members, I preferably mount a collar 45 upon a cylindrical portion 46 of the cone clutch 31. The collar 45 is provided with an annular flange 47 which fits within a dust excluding collar 48 having an inturned flange 49 and having its inner surface provided with an annular channel at 50 adjacent to flange 49.

Clearance for the floating adjustments heretofore described is provided between the inner margin of the flange 49 and the inner end portion of the sleeve 11. A ring 55 within the channel 50 is closely fitted to the outer surface of the clutch member 30 at its inner end, and has sliding contact with the walls of the channel 50, thus providing a substantially dust tight joint while permitting said floating movements of the tool holder.

*The modified coupling*

In Figure 4 I have illustrated a reamer of ordinary type provided with cutters 10a mounted in the holder sleeve 11a and secured by lock nuts 12a and 13a. This sleeve 11a has a conically tapered bore 60 into which a tapered centering pin 61 is fitted. The pin 61 has its inner end portion 22a encircled by a collar 62 connected to the centering pin 61 by a cross pin 24a. The outer side of the collar 62 is provided with clutch jaws 16a adapted to be received in correspondingly shaped notches 63 formed in the inner end of the tool holder 11a. The portion 22a of the centering pin has sufficient clearance to allow it to shift on the cross pin 24a for offsetting purposes.

The pin 24a also extends through a sleeve 23a corresponding with the sleeve 23 in Figure 1.

The sleeve 23a is connected by a pivot pin 26a with the reduced end 27a of the driving shank or arbor 28a.

A locking cone clutch member 30a, corresponding with the clutch member 30 in Figure 1, is connected with the clutch jaws 16a, and as the latter engages in the recesses 63 of the tool holder, it will be obvious that the cone clutch member 30a is secured to the tool holder for rotation therewith, although actually forming a portion of the driven connections or elements of the floating coupling.

A manually adjustable collar 35a is directly connected with the cone clutch member 31a to shift the latter upon the portion 32a of the arbor 28a. This collar 35a with its anchor ring 38a, engageable selectively in grooves 39a and 40a, corresponds both structurally and functionally with the rocking collar 35 and associated parts in Figure 1. Means for excluding dust from the clutch members being the same as in Figure 1, it is unnecessary to repeat the description or to designate these parts by reference characters.

One of the advantages of the structure as disclosed in Figures 4, 5, and 6 is that it facilitates applying my invention to an ordinary reaming head by interposing my improved floating coupling between the driving shank and the reaming head. Neither the specific centering means indicated at 61 nor the specific connection between the member 30a of the cone clutch and reaming head are essential, although I prefer to employ the square jawed clutch members 16a and to engage them in corresponding notches cut in the inner end of the tool holder 11a.

In the modified form of construction shown in Figure 7, the shank 28b is provided with an annular flange 70 through which an adjusting bolt 71 loosely passes with the head of the bolt 72 normally bearing against the flange 70. The other end of the bolt is threaded into a collar 35b, with which the cone clutch 31b is connected substantially as shown in Figure 1. The lock nut 74 secures the bolt 71 in fixed relation to the collar 35b. When the clutch member 31b is retracted, the friction of the collar 35b may be relied upon to hold it in the retracted position, but when the cone clutch member 31b is in gripping position it may be securely held in that positon by an arcuate cam 76 mounted to oscillate upon the reduced portion of the arbor 28b between the flange 70 and the shoulder 73. In one position the cam member 76 allows the head 72 of the bolt 71 to move freely between its ends during a retractive movement of the collar 35b and clutch member 31b.

But when the collar 35b is adjusted to lock the tool holder to the arbor, as above explained, with reference to Figure 1, or as explained with reference to Figure 4, then the cam member 76 may be rotated to bring its cam surface 77 into progressive pressure engagement with the outer face of the bolt head 72, whereupon the cam member will be held in place by friction, and the bolt and associated clutch member will be securely held against accidental retraction.

It will be understood that any one of the locking clutches 31, 31a, or 31b may be employed to rigidly secure any tool holder to its driving arbor to prevent a floating of the tool holder upon intermediate driving connections, regardless of whether the latter embody the connections herein disclosed or any ordinary form of floating connection.

In Figure 8, a collar 79 is illustrated which is mounted for rotation upon a collar 35c which carries the clutch member 31c. The collar 79 is keyed to the collar 35c by balls 80, socketed in the outer collar 79 and loosely engaged in an annular channel 81 formed in the clutch carrying collar 35c.

This permits the outer collar to be manually grasped and held without rotation, preparatory to a withdrawal of clutch member 31c from its engagement with a clutch member associated with the tool holder.

I claim:

1. The combination with a tool holder, of a driving arbor, connections between the driving arbor and tool holder adapted to allow piloted movement of the tool holder out of line with the axis of the arbor, and a sliding clutch associated with the arbor and adapted in one position to retain the tool holder in alignment with the arbor subject to a release of the tool holder under manual pressure applied to the sliding clutch member, said member being movable while the arbor is in rotation, and normally adapted to be manually held against rotation with the arbor.

2. The combination with a tool holder, of a driving arbor, and a floating connection between the arbor and the tool holder, adapted to permit floating movements of the tool holder to positions with its axis parallel to the axis of the arbor and positions oblique thereto, of a collar mounted for sliding adjustment upon the arbor and adapted to permit rotation of the arbor therein, and a centering member connected with the collar for movement therewith and adapted to be adjusted by the collar into and out of engagement with the tool holder to either secure the latter with its axis in line with the axis of the arbor or release it for said floating movements.

3. A floating tool holder in combination with a driving arbor having a loosely rotatable sliding collar thereon, a centering clutch associated with said collar and adapted in one position to hold the tool holder against floating movement, and detent means normally preventing sliding movements of the collar and adapted to yieldingly permit such sliding movements under manual pressure applied to the collar.

4. The combination of a driving arbor, a tool holding sleeve, coupling elements within the sleeve connecting it with the driving arbor and adapted to allow both offsetting and tilting movements of the sleeve, a clutch member mounted to slide upon the arbor and adapted in one position to rigidly center the sleeve and in the other position to release it for floating movement and a detent normally holding the clutch member in one of two positions of adjustment, said detent being yieldable under manual pressure applied to the clutch member to shift it axially and the arbor being freely rotatable within the clutch member whereby the clutch may be released or engaged while tools are in operation.

5. The combination of a driving arbor, a reamer normally in floating connection with the arbor, a collar mounted to slide upon the arbor, said collar having internal grooves and a conical extension adapted to serve as a centering clutch for the reamer, a split ring loosely anchored to the arbor and engageable in either of the collar grooves when in registry therewith, said arbor being freely rotatable within the collar whereby the collar may be manually shifted while the arbor is in rotation to either center the reamer or release it for floating operation.

6. In lineally arranged combination, a hollow tool holder member, a set of coupling members within the tool holder, a driving shank member, said members being operatively connected to transmit motion from the driving member to the tool holder member, a slidable clutch associated with the driving shank member and adapted in one position to retain the tool holder in alignment with said shank member, and in another position to provide for a limited offsetting and tilting movement of the tool holder with respect to the shank, said tilting movement being limited by the engagement of the tool holder with said clutch.

7. In lineally arranged combination, a hollow tool member, a set of coupling members within the tool holder member, a driving shank member, said members being operatively connected to transmit motion from the driving member to the tool holder member, said coupling member including spaced elements having reduced aligned shanks, one of said elements being secured to the tool holder member, a sleeve fitting on the shanks, pins pivotally connecting the sleeve to said spaced elements on crossed axes, said shanks being spaced from the inner wall of the sleeve to form a clearance therebetween, a portion of said tool holder member surrounding but slightly spaced from said coupling elements whereby to provide limited offsetting and tilting movement of the tool holder member relative to the driving shank member.

EDWARD A. ZEMPEL.